(12) United States Patent
Hertzog et al.

(10) Patent No.: US 7,543,072 B1
(45) Date of Patent: Jun. 2, 2009

(54) METHOD AND SYSTEM CAPABLE OF PERFORMING A DATA STREAM OVER MULTIPLE TCP CONNECTIONS OR CONCURRENT INTERLEAVE OF MULTIPLE DATA STREAMS OVER MULTIPLE TCP CONNECTIONS

(75) Inventors: Scott P. Hertzog, Round Rock, TX (US); Brian C. Morris, Austin, TX (US); Thomas P. Yohe, Dayton, OH (US)

(73) Assignee: Stampede Technologies, Inc., Dayton, OH (US)

( * ) Notice: Subject to any disclaimer, the term of this patent is extended or adjusted under 35 U.S.C. 154(b) by 829 days.

(21) Appl. No.: 10/904,313

(22) Filed: Nov. 3, 2004

(51) Int. Cl.
*G06F 15/16* (2006.01)
*G06F 12/00* (2006.01)
(52) U.S. Cl. ...................... 709/231; 709/238
(58) Field of Classification Search ............ 709/230, 709/231, 238, 239, 250
See application file for complete search history.

(56) References Cited

U.S. PATENT DOCUMENTS

| 6,453,354 | B1 * | 9/2002 | Jiang et al. ............... 709/229 |
| 6,615,240 | B1 * | 9/2003 | Sullivan et al. ........... 709/205 |
| 6,934,760 | B1 * | 8/2005 | Westbrook et al. ........ 709/231 |

* cited by examiner

*Primary Examiner*—Zarni Maung
(74) *Attorney, Agent, or Firm*—R. William Graham

(57) ABSTRACT

A system for performing concurrent interleaves of multiple data streams over multiple TCP/IP connections includes a computer having data stream optimizing software for identifying the need of data stream exchange and initiating TCP/IP software to enable multiple TCP/IP connections, wherein data stream optimizing software is capable of uniquely splitting the obtained data, monitoring each established TCP/IP connection for availability of data transmission and transmitting over at least one of the TCP/IP connections based upon its availability the split data to another computer having data stream optimizing software thereon having the ability to assemble the split data received in a manner to be readily used.

12 Claims, 2 Drawing Sheets

METHOD AND SYSTEM CAPABLE OF PERFORMING A DATA STREAM OVER MULTIPLE TCP CONNECTIONS OR CONCURRENT INTERLEAVE OF MULTIPLE DATA STREAMS OVER MULTIPLE TCP CONNECTIONS

BACKGROUND OF THE INVENTION

1. Field of the Invention

The present invention relates to enhancements and performance in data transfer over TCP/IP (Transmission Control Protocol/Internet Protocol) connections. More particularly, the invention relates to a method and system capable of performing a data stream over multiple TCP/IP connections or concurrent interleaves of multiple data streams over multiple TCP/IP connections.

2. Related Art

TCP/IP is the basic communication language or protocol of the Internet. It can also be used as a communications protocol in a private network (either an intranet or an extranet). When you are set up with direct access to the Internet, your computer is provided with a copy of the TCP/IP program just as every other computer that you may send messages to or get information from also has a copy of TCP/IP.

TCP/IP is a two-layer program. Transmission Control Protocol is the higher layer which manages the assembling of a message or file into smaller packets that are transmitted over the Internet and received by a TCP/IP layer that reassembles the packets into the original message. Internet Protocol (IP) is the lower layer that handles the address part of each packet so that it gets to the right destination. Each gateway computer on the network checks this address to determine where to forward the message. Even though some packets from the same message are routed differently than others, they'll be reassembled at the destination.

Current TCP/IP uses the client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer.

A current drawback or limitation in the system is that the TCP/IP layer itself is not stateless as far as any one message is concerned. Its connection remains in place until all packets in a message have been received. Further, the connection may remain in place for many message exchanges.

Consequently, the TCP/IP layer or connection can get bogged down due to a router connection or a dropped packet thus requiring retransmission of the packet. This requires renegotiation of a window size (e.g., up to 64K.) Renegotiation basically starts the window over or at a lower value.

Further, another inherent problem exists with TCP/IP in that the protocol was not designed for high bandwidth/high speed networks. The TCP/IP protocol as well as other protocols such as World Wide Web's Hypertext Transfer Protocol (HTTP) or the File Transfer Protocol (FTP) were written a over a decade ago and designed for communication over much slower communication links.

More recently, there has been an attempt to increase the speed of the data transfer over these traditional links in providing multiple TCP/IP connections. In such case, there are provided parallel TCP/IP connections wherein data is divided up and sent over a designated TCP/IP connection. While this has provided some improvement, there remains a need to improve the rate in which such data can be transmitted over such links. The present invention provides such a solution.

SUMMARY OF THE INVENTION

It is an object to increase the speed in which data is transmitted between two endpoints.

It is another object to increase the reliability of data transfer over a TCP/IP connection.

It is yet another object to interleave multiple data streams across multiple TCP/IP connections.

It is yet another object to increase the speed in which data of unknown length at time of transfer initiation can be moved between two endpoints.

It is still another object to enhance data transfer across a TCP/IP connection when latency occurs in fetching data from a server.

It is another object to provide smart routing of data as a function of TCP/IP connection and data transfer availability.

It is a further object to enhance compression technology for transmission over a connection.

It is yet another object to enhance secure transmission of data over a connection.

It is another object to provide a virtually increased TCP/IP data transfer window size.

Accordingly, the present invention is directed to a method and system capable of performing a data stream over multiple TCP/IP connections or concurrent interleaves of multiple data streams over multiple TCP/IP connections. In one embodiment, the system includes a server computer having TCP/IP server software and data stream optimizing software operably associated therewith for enabling multiple TCP/IP connections upon identifying a need for data stream exchange, such as receiving a Request for data, wherein the data stream optimizing software includes software for monitoring each established TCP/IP connection for availability of data transmission and transmitting data to at least one of the TCP/IP connections based upon its availability. The data stream optimizing software is equipped to retrieve and dynamically split the data and transmit the split data in a manner dictated by the monitoring software.

The system further includes a client computer communicatively linked to the server computer and has client application software capable of data stream exchange, which can be web browser software, for example. The client computer includes TCP/IP client software which is operably associated with the application software for enabling a TCP/IP connection between the client computer and the server software. The application software includes the ability for generating the Request for data, for example, from the server computer. Data stream optimizing software is provided for identifying a need for data stream exchange, for example, acting on the Request for data and receiving the requested data from the server computer in a manner to be readily displayed on the client computer.

The data stream optimizing software has the ability to assemble the split data received over one or more TCP/IP connections in a manner to be readily displayed on the client computer. It is contemplated that the data stream optimizing software provides for bi-directional exchange of data wherein either computer can serve a client or server.

Other objects and advantages will be readily apparent to those skilled in the art upon viewing the drawings and reading the detailed description hereafter.

DETAILED DESCRIPTION OF THE INVENTION

Figure 1:
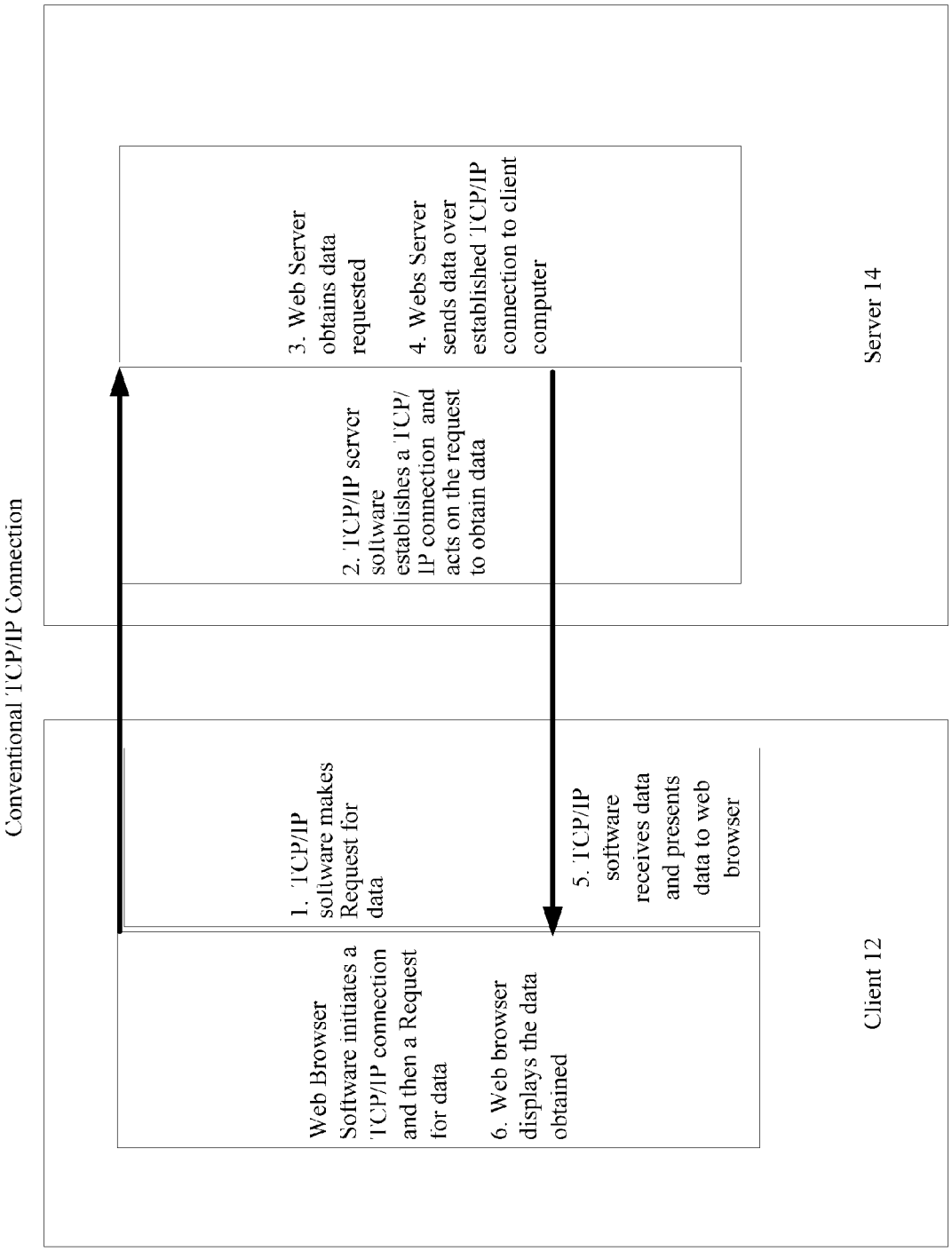
FIG. 1 is an illustration of the state of the art for TCP/IP data transfer.

Referring now to the drawings, FIG. 1 depicts and the current state of the art. FIG. 1 depicts a client computer 12 and a web server computer 14. Conventionally, a TCP/IP connection is performed as follows. The web server computer 14 is understood to include an operating system/software, server software, memory and linking devices as is known in the art. The client computer 12 likewise includes an operating system/software, web browser software having, memory and linking devices as is known in the art and can be communicatively linked to the web server computer 14.

The client computer 12 and web server computer 14 also have TCP/IP software operably disposed thereon for enabling a TCP/IP connection, wherein TCP/IP server software includes an ability to act on a Request for data made by the client computer 12. The client computer 12 uses TCP/IP software to make a Request for data, such as an object or web page. The TCP/IP client software establishes a TCP/IP connection with the TCP/IP server software and acts on the request to obtain data.

The web server computer 14 obtains data requested and provides the data to the TCP/IP software where the data is in turn sent to the TCP/IP software on the client computer 12. The TCP/IP software receives data and presents data to web browser and it is subsequently displayed.

Figure 2:
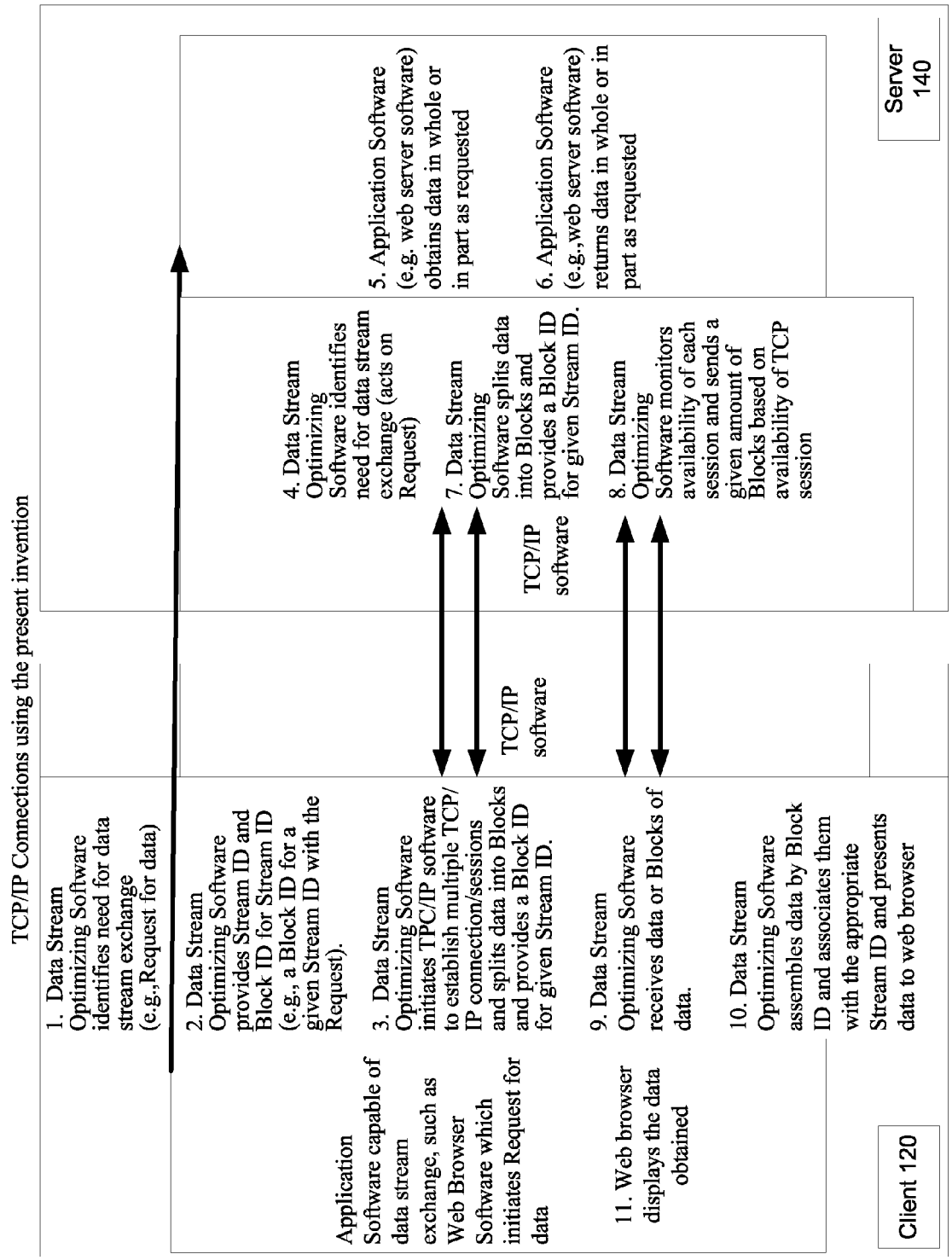
FIG. 2 is an illustration of a TCP/IP data transfer using the present invention.

The following description is intended to illustrate an embodiment incorporating the present invention, yet it is realized that the invention can have application in various types of data interchange. Thus, one embodiment of the present invention is generally depicted in FIG. 2.

The invention is directed to method and system capable of performing a data stream over multiple TCP/IP connections or concurrent interleaves of multiple data streams over multiple TCP/IP connections. The system includes a client computer 120 includes an operating system/software, application software capable of data stream exchange, such as web browser software for generating a Request for data and or receiving data, TCP/IP software operably disposed thereon, memory and linking devices as is known in the art.

Data stream optimizing software for identifying a need for data stream exchange is also provided includes the means for assembling the split Block data when received from a server computer 140 as discussed hereinafter and presenting the assembled data to the application software, e.g., web browser software, for use or display. The server computer 140, which can be a web server computer, which has memory, an operating system/software, server software, application software capable of data stream exchange, for obtaining requested data for example, TCP/IP software operably disposed thereon, linking devices as is known in the art and is communicatively linked to the client computer 120.

Further, the computer 140 also has data stream optimizing software for identifying a need for data stream exchange. The data stream optimizing software provides for a Stream Identifier for the data stream and provides a Block ID for given a given Stream Identifier for each data Block and the data stream optimizing software is equipped to assemble the split data received over at least one TCP/IP connection using the Block ID in a manner to be readily displayed on the client computer 120.

The data stream optimizing software can provide for a Stream Identifier for each Request and initiate multiple TCP/IP connections/sessions through the TCP/IP software, as well as split requested data into Blocks and associate a unique Block ID with each Stream Identifier. The data stream optimizing software monitors which TCP/IP connection is available for sending one or more Blocks of data to the client computer 120.

The operation of the system can be seen in the example of FIG. 2. The client computer can have web browser software (application software) which initiates a Request for data. The data stream optimizing software identifies the need for data stream exchange (the Request for data). The data stream optimizing software provides Stream Identifier and Block identifier for Stream Identifier (e.g., a Block ID for a given Stream Identifier with the Request).

The data stream optimizing software initiates TPC/IP software to establish multiple TCP/IP connection/sessions. For example, four connections have been found to be suitable, but more or less may be used to achieve a desired performance. The data stream optimizing software acts on the needed data stream, e.g. Request to obtain the data, without regard to object size.

Application software on the server obtains data in whole or in part as requested and returns the data to the data stream optimizing software. The data stream optimizing software dynamically splits data into Blocks and provides a Block ID for each block with a given Stream Identifier. This is an important feature over the prior art, since data stream optimizing software does not look at whether the data is compressed, for example, rather simply splits the data and then transmits, the transmitted data size will be smaller in some cases such as at the object level, where object may be larger if compressed in multiple parts than if there was a single compression of the original object. Thus, the present invention provides for streaming of split data.

The data stream optimizing software also monitors availability of each session and sends a given amount of data Blocks based on availability of each TCP/IP session. Here, the invention provides a further dynamic feature in that there is intelligence provided for dynamically monitoring the ability to throughput data on a particular TCP/IP session and pushes data Blocks over any available open session without regard to a particular order of the data. The invention thus permits multiple Requests to be made, with bits and pieces of data in the form of these Blocks having a particular Block ID and associated Stream Identifier to be sent over a multiple of TCP/IP connections. This is a departure from the prior art wherein data requested was assigned and sent to a particle TCP/IP connection and waited for it to be sent as soon as the data was obtained and then sent only through such designated session.

The data stream optimizing software receives data or Blocks of data and associates them with the appropriate Stream Identifier and assembles data by Block ID and presents data to web browser for display. By so providing, the above described objects have been obtained.

It is understood that the terms server and client as used herein contemplate that any computer can serve either function depending upon whether it is the computer providing or requesting data. Thus, the invention contemplates a peer to peer environment with a bidirectional data flow and the claims appended hereto should be so construed. Thus, the data stream optimizing software is envisioned as having the same functionality on both computers to provide for bi-directional exchange of data.

The web example makes one side a client but the improved data transmission is exactly the same in both directions. Further, that while the example recites for a Request for data, this is exemplary of a Command, and the invention and claims are not intended to be so limited by the specific term, rather a Stream Identifier.

A representative section of code for performing a function of the sending and receiving of data in a manner as described is as follows:

//////////////// Code for sending interleaved data
//*******************************************************************
//

```c
// FUNCTION:  SendIHAPRsp(PVCB pVcb,LPBYTE pData,DWORD dThisLen,lpTGOC_OBJECT_HANDLE pOh,WORD wStreamID)
// PURPOSE:   This function sends interleaved data to clients
//
TGOC_STATUS SendIHAPRsp(PVCB pVcb,LPBYTE pData,DWORD dThisLen,lpTGOC_OBJECT_HANDLE pOh,WORD wStreamID)
{
    PODDCB pODDcb;
    pHAP_ILBLOCKHDR pILHdr = {0};
    PDWORD pBlockID = (LPDWORD)(&pOh->Playground[sizeof(PLAYGROUND)]);
    BYTE bMore = TRUE;
    DWORD dDataSize = dThisLen;
    fd_set WriteTemplate = {0};
    struct timeval Timeout = {0};
    PSCB pSendingScb;
    int iRc;
    WORD wSendsPerformed = 0;
    DWORD dDataLenSent = 0;
    DWORD dSendSize;
    WORD wSocketsDone = 0;
    LPBYTE pSenddata;
    PSCB pVcbScbLink;
    PCCB pCcb;
    WORD wNumSocketstoUse;
    int i;
    DWORD dCurrentPolicyCheckSum = TgHtmlSvGetAppPolicySignatureEntry(NULL);
    PSCB pScb;
    WORD wTimeouts = 0;
```

```
wNumSocketstoUse = pVcb->wNumSockets;
while(wNumSocketstoUse)
{
        if (dThisLen/wNumSocketstoUse <
Ctab.iIHAPDataSize + sizeof(HAP_ILBLOCKHDR))
                wNumSocketstoUse--;
        else
                break;
}
if (wNumSocketstoUse == 0)
        wNumSocketstoUse = 1;
if (TGOC_PF_DONTSAVE & pOh-
>dPrivateFlags)
{
        return(0);
}
TGEnterCriticalSection(&pVcb-
>VcbHdr.VCBSendCritSection);
pVcbScbLink = pVcb->pScbs;
while(pVcbScbLink)
{
        pVcbScbLink->bFinishedSending =
FALSE;
        pVcbScbLink->wActivity =
Ctab.wInactivityTimeout;
        pVcbScbLink = pVcbScbLink-
>pNextScbOnVcb;
}
        if (TGOC_PF_EOF & pOh->dPrivateFlags)
        {
                if (dThisLen == 0) // we don't keep
chain states in IL mode && pCcb->bProcessingSndState ==
CCB_PS_STARTCHAIN)
```

```
                    {
                        // if we are between chains and a null post happens then just return
                        // this shouldn't ever happen, but we saw it once
                        dDataSize = 1;        // this is just to force a null packet with LIC through
                    }
                    bMore = FALSE;        // if this is all there is turn the more flag off
                }
                while(dDataSize)
                {
                    if (pVcb->bState == VCB_RESET)
                    {

TGLeaveCriticalSection(&pVcb->VcbHdr.VCBSendCritSection);
                        return(1);
                    }
                    // check all sockets for writeablitiy
                    WriteTemplate = pVcb->WriteTemplate;
                    Timeout.tv_sec = 5;
                    if ((iRc = select (pVcb->HighestSocket+1,NULL,&WriteTemplate,NULL,&Timeout)) == SOCKET_ERROR )
                    {
                        if (iRc == TgWSAGetLastError())
                        {

L1_TRACEEVENT1("SendIHAPRsp - Select error = %d",iRc);
```

```
            }

TGLeaveCriticalSection(&pVcb-
>VcbHdr.VCBSendCritSection);
                        return(1);
            }
            else if (iRc != 0)
            {
                for (i=0; i<pVcb-
>wNumSockets;i++)
                {
                        if (dDataSize == 0)
                            break;
                        pSendingScb =
NextScb(pVcb);
                        if ((pCcb =
pSendingScb->pCcb) == NULL)
                        {

TGLeaveCriticalSection(&pVcb-
>VcbHdr.VCBSendCritSection);
                            return(1);
                        }
                        // if the socket is ready
to send and something is not already queued
                            if
(FD_ISSET(pSendingScb->Socket,&WriteTemplate))
                            {
                                // if nothing is
queued to this socket then queue a buffer
                                if (pSendingScb-
>pCcb->SndBufQ.pHead == NULL/* && dDataSize != 0*/ )
                                {
```

```
if ((pODDcb = ALLOC_DCBQ(&pSendingScb->qDCBFree)) == NULL)
    {

TGLeaveCriticalSection(&pVcb->VcbHdr.VCBSendCritSection);

return(1);
    }
    pILHdr = (pHAP_ILBLOCKHDR)(&pODDcb->Event.ODClientMess);
    if (*pBlockID == 0)    // new message
    if block id is 0
    { pILHdr->dFlags |= HAPIL_F_FIC;

// if the checksum has changed then notify client
        if (pVcb->dPolicyChecksum != dCurrentPolicyCheckSum)
        { pVcb->dPolicyChecksum = dCurrentPolicyCheckSum;

pILHdr->dFlags |= HAPIL_F_CKSUMCHANGE;
        }
    }
    if (pOh->pOinfo->wCompressionAlg == TGOC_CA_ZLIB)

pILHdr->dFlags |= HAPIL_F_ZLIBCOMP;
```

```
pILHdr->dBlockID = SWAPIFNEEDED_DWORD(*pBlockID);     // blockid of this piece

*pBlockID = *pBlockID+1;

// compute what piece to sending and appropriate sizes if (wSendsPerformed < wNumSocketstoUse-1)
{
    dSendSize = dThisLen/wNumSocketstoUse;

dDataLenSent += dSendSize;
}
else
{
    dSendSize = dThisLen - dDataLenSent;
}
pSenddata = pData+((wSendsPerformed) *(dThisLen/wNumSocketstoUse));

dDataSize -= dSendSize;

if (!bMore && (dDataSize == 0 || dThisLen == 0))
{
    pILHdr->dFlags |= HAPIL_F_LIC;
}
pILHdr->dFlags = SWAPIFNEEDED_DWORD(pILHdr->dFlags);
```

```
                    pILHdr->wStreamId = SWAPIFNEEDED_WORD(wStreamID));
                    pILHdr->dLen = SWAPIFNEEDED_DWORD(sizeof(HAP_ILBLOCKHDR) + dSendSize);
                    //
                    pILHdr->wObjectID     // unique id
                                            //
                                            if (dThisLen == 0)
                                            {
                                                pODDcb->iDataLenInBuf = sizeof(HAP_ILBLOCKHDR);

dDataSize = 0;
                                            }
                                            else
                                            {
                                                memcpy((LPBYTE)((LPBYTE)pILHdr+sizeof(HAP_ILBLOCKHDR)),pSenddata,dSendSize);

pODDcb->iDataLenInBuf = dSendSize + sizeof(HAP_ILBLOCKHDR);
                                            }

PutStructE(&pSendingScb->pCcb->SndBufQ,(PSTRHDR)pODDcb);

wSendsPerformed++;
                                        }
                                        pSendingScb->wActivity = Ctab.wInactivityTimeout;

TransportSend(pSendingScb);
                                    }
```

```
                }
            }
        }
        if (!bMore || Ctab.bIHAPPacing)
        {
            pScb = pVcb->pScbs;
            while(pScb)
            {
                if (pSendingScb->pCcb->SndBufQ.pHead != NULL)
                    FD_SET(pSendingScb->Socket,&WriteTemplate);
                else
                    wSocketsDone++;
                pScb = pScb->pNextScbOnVcb;
            }
            while (wSocketsDone < pVcb->wNumSockets)
            {
                //    L1_TRACEEVENTs("Looping waiting on socket");
                Timeout.tv_sec = 5;
                if ((iRc = select (pVcb->HighestSocket+1,NULL,&WriteTemplate,NULL,&Timeout)) == SOCKET_ERROR )
                {
                    if (iRc == TgWSAGetLastError())
                    {
                        L1_TRACEEVENT1("SendIHAPRsp - Select error = %d",iRc);
                    }
```

```
                TGLeaveCriticalSection(&pVcb-
>VcbHdr.VCBSendCritSection);
                                        return(1);
                                    }
                                    if (iRc == 0)
                                    {
                                        wTimeouts++;

IL_TRACEEVENT1("Timeout in IHAP CallBack for
vcb = 0x%x",pVcb);
                                        if (wTimeouts >
Ctab.wTransportTimeoutThreshold-1)
                                        {

L1_TRACEEVENT1("Max transmit timeouts
exceeded - Terminating Session with vcb 0x%x)",pVcb);
                                            break;
                                        }
                                    }
                                    else
                                    {
                                        wTimeouts = 0;
                                    }
                                    pSendingScb = pVcb-
>pScbs;

while(pSendingScb)
                                    {
                                        if (pSendingScb-
>bState == SCB_RESET || bShutDown)
                                            break;
                                        if (pSendingScb-
>pCcb->SndBufQ.pHead != NULL)
                                        {
```

```
                if (FD_ISSET(pSendingScb->Socket,&WriteTemplate))
                {
                    TransportSend(pSendingScb);
                    if (pSendingScb->pCcb->SndBufQ.pHead == NULL)
                        wSocketsDone++;
                    else
                        FD_SET(pSendingScb->Socket,&WriteTemplate);
                }
                else
                {
                    FD_SET(pSendingScb->Socket,&WriteTemplate);
                }
            }
            if (wSocketsDone == pVcb->wNumSockets )
                break;
            pSendingScb = pSendingScb->pNextScbOnVcb;
        }
    }
}
/////////////// Code for Receiving interleaved data
//*******************************************************************
//
// FUNCTION: QIHAPData(PTGORAPICMD pTGorapiCmd,PODDCB pODDcb)
```

```
//
//    PURPOSE:   Q IHAP response to orapi command in order
//
void QIHAPData(PTGORAPICMD pTGorapiCmd,PODDCB pODDcb)
{
        STRHDR *pNextODDcb;
        STRHDR *pLastDcb;
        BYTE bInserted = FALSE;
        if (pTGorapiCmd->IHAPBufferQ.pNext== NULL)
        {
                pTGorapiCmd->IHAPBufferQ.pNext = pODDcb;
        }
        else
        {
                pLastDcb = &pTGorapiCmd->IHAPBufferQ;
                // find where to insert this one.
                pNextODDcb = (STRHDR *)(pTGorapiCmd->IHAPBufferQ.pNext);
                while (pNextODDcb)
                {
                        if (pODDcb->dCurrentIHAPBlockID < ((PODDCB)(pNextODDcb))->dCurrentIHAPBlockID)
                        {
                                pODDcb->Hdr.pNext = pNextODDcb;
                                pLastDcb->pNext = pODDcb;
                                bInserted = TRUE;
```

```
                                break;
                        }
                        pLastDcb = pLastDcb-
>pNext;
                        pNextODDcb =
pNextODDcb->pNext;
                    }
                    if (!bInserted)
                    {
                        pLastDcb->pNext =
pODDcb;
                    }
                }
            }
        }
//***********************************
******************************
        //
        //  FUNCTION:  IHAPProcessRcv(PCCB
pLocalCcb,PODDCB pODDcb)
        //
        //  PURPOSE:   process incoming packets
        //
        void IHAPProcessRcv(PCCB
pLocalCcb,PODDCB pODDcb)
        {
            PTGORAPICMD  pTGorapiCmd = NULL;
            BYTE bOrapiPosted;
            PODDCB pTmpDcb;
            PCCB pCcb = ((PCCB)(pLocalCcb-
>pPartnerCcb));
            if ((pTGorapiCmd =
FindOrapiCmd(&pLocalCcb->pPendOrapiCmd, pODDcb-
>wStreamID))) == NULL)
            {
```

```
                                    DEALLOC_IHAPDCB(pODDcb);
                                    return;
}
                    if (pTGorapiCmd->dLastBlkProcessed
== pODDcb->dCurrentIHAPBlockID)
                        {
                                    if ((bOrapiPosted =
IHAPProcessPacket(((PCCB)(pLocalCcb-
>pPartnerCcb)),pODDcb,pTGorapiCmd,pLocalCcb)) != TRUE)
                                        {

DEALLOC_IHAPDCB(pODDcb);
                                                pTGorapiCmd-
>dLastBlkProcessed++;
                                        }
                                    else
                                        {

DEALLOC_IHAPDCB(pODDcb);
                                                return;
                                        }
                        }
                    else
                        {

QIHAPData(pTGorapiCmd,pODDcb);
}
                                pODDcb = (PODDCB)(pTGorapiCmd-
>IHAPBufferQ.pNext);
                                while(pODDcb && (pTGorapiCmd-
>dLastBlkProcessed == pODDcb->dCurrentIHAPBlockID))
                                    {
```

```
                    if ((bOrapiPosted =
IHAPProcessPacket(pCcb,pODDcb,pTGorapiCmd,pLocalCcb)) !=
TRUE)
                            {
                                    pTGorapiCmd-
>IHAPBufferQ.pNext = pODDcb->Hdr.pNext;
                                    pODDcb->Hdr.pNext =
NULL;

DEALLOC_IHAPDCB(pODDcb);
                                    pTGorapiCmd-
>dLastBlkProcessed++;

pODDcb =
(PODDCB)(pTGorapiCmd->IHAPBufferQ.pNext);
                            }
                            else
                            {
                                    break;
                            }
                    }
            }=
```

The above described embodiment is set forth by way of example and is not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A system for performing one of a data stream over multiple TCP/IP connections and concurrent interleaves of multiple data streams over multiple TCP/IP connections between at least two computers, which includes:
a first computer having application software capable of data stream exchange operably disposed thereon, TCP/IP software operably associated therewith, data stream optimizing software for identifying a need for data stream exchange and initiating said TCP/IP software to enable multiple TCP/IP connections;
a second computer having application software capable of data stream exchange operably disposed thereon, TCP/IP software operably associated therewith and for enabling said TCP/IP connections with said first computer, data stream optimizing software for identifying a need for data stream exchange and wherein said data stream optimizing software is equipped to retrieve and dynamically split said data and transmit said split data in a manner dictated by said data stream optimizing software based on ability to throughput said data on any open TCP/IP connection without regard to a particular order of said split data, wherein said data stream optimizing software monitors each established TCP/IP connection for availability of data transmission and transmits said needed data to said first computer over at least one of the TCP/IP connections based upon each said TCP/IP connection's availability; and
wherein said data stream optimizing software on said first computer is equipped to assemble said split data in a manner to be used by said application software.

2. The system for performing one of a data stream over multiple TCP/IP connections and concurrent interleaves of multiple data streams over multiple TCP/IP connections between at least two computers of claim 1, wherein said data stream optimizing software provides for a Stream Identifier with a Request and provides a Block ID for given Stream Identifier for each Block.

3. The system for performing one of a data stream over multiple TCP/IP connections and concurrent interleaves of multiple data streams over multiple TCP/IP connections between at least two computers of claim 1, wherein said data stream optimizing software provides for a Stream Identifier for said data stream and provides a Block ID for a given Stream Identifier for each Block and said data stream optimizing software is equipped to assemble said split data received over at least one TCP/IP connection using said Block ID and Stream Identifier in a manner to be readily displayed on said first computer.

4. The system for performing one of a data stream over multiple TCP/IP connections and concurrent interleaves of multiple data streams over multiple TCP/IP connections between at least two computers of claim 1, wherein said data stream optimizing software on both said first computer and said second computer are capable of identifying a need for data stream exchange and initiating said TCP/IP software to enable multiple TCP/IP connections and wherein said data stream optimizing software is equipped to retrieve and dynamically split said data and transmit said split data in a manner dictated by said data stream optimizing software based on ability to throughput said data on any open TCP/IP connection without regard to a particular order of said split data, monitoring each established TCP/IP connection for availability of data transmission and transmitting said needed data to said other computer over at least one of the TCP/IP connections based upon each said TCP/IP connection's availability.

5. The system for performing one of a data stream over multiple TCP/IP connections and concurrent interleaves of multiple data streams over multiple TCP/IP connections between at least two computers of claim 4, wherein said data stream optimizing software provides for a Stream Identifier for said data stream and provides a Block ID for given a given Stream Identifier for each Block and said data stream optimizing software is equipped to assemble said split data received over at least one TCP/IP connection using said Block ID in a manner to be readily displayed on the each computer.

6. The system for performing one of a data stream over multiple TCP/IP connections and concurrent interleaves of multiple data streams over multiple TCP/IP connections between at least two computers of claim 1, wherein said data stream optimizing software establishes at least one TCP/IP connection.

7. A method for performing one of a employing data stream over multiple TCP/IP connections and concurrent interleaves of multiple data streams over multiple TCP/IP connections between at least two computers, which includes the steps of: employing a first computer having application software capable of data stream exchange operably disposed thereon, TCP/IP software operably associated therewith, data stream optimizing software for identifying a need for data stream exchange and initiating said TCP/IP software to enable multiple TCP/IP connections; and employing a second computer having application software capable of data stream exchange operably disposed thereon, TCP/IP software operably associated therewith and for enabling said TCP/IP connections with said first computer, data stream optimizing software for identifying a need for data stream exchange and wherein said data stream optimizing software is equipped to retrieve and dynamically split said data and transmit said split data in a manner dictated by said data stream optimizing software based on ability to throughput said data on any open TCP/IP connection without regard to a particular order of said split data, wherein said data stream optimizing software monitors each established TCP/IP connection for availability of data transmission and transmits said needed data to said first computer over at least one of the TCP/IP connections based upon each said TCP/IP connection's availability; and
wherein said data stream optimizing software on said first computer assembles said split data in a manner to be used by said application software.

8. The method for performing one of a data stream over multiple TCP/IP connections and concurrent interleaves of multiple data streams over multiple TCP/IP connections between at least two computers of claim 7, wherein said data stream optimizing software provides for a Stream Identifier and a Block ID for a given Stream Identifier for each Block.

9. The method for performing one of a data stream over multiple TCP/IP connections and concurrent interleaves of multiple data streams over multiple TCP/IP connections between at least two computers of claim 7, wherein said data stream optimizing software on said second computer provides for a Stream Identifier for said data stream and provides a Block ID for a given Stream Identifier for each Block and said data stream optimizing software on said second computer is equipped to assemble said split data received over at least one TCP/IP connection using said Block ID and Stream Identifier in a manner to be readily displayed on said first computer.

10. The method for performing one of a data stream over multiple TCP/IP connections and concurrent interleaves of multiple data streams over multiple TCP/IP connections between at least two computers of claim 7, wherein said data stream optimizing software on both said first computer and said second computer are capable of identifying a need for data stream exchange and initiating said TCP/IP software to enable multiple TCP/IP connections, monitoring each established TCP/IP connection for availability of data transmission and transmitting said needed data to said other computer over at least one of the TCP/IP connections based upon each said TCP/IP connection's availability.

11. The method for performing one of a data stream over multiple TCP/IP connections and concurrent interleaves of multiple data streams over multiple TCP/IP connections between at least two computers of claim 10, wherein said data stream optimizing software provides for a Stream Identifier for said data stream and provides a Block ID for given a given Stream Identifier for each Block and said data stream optimizing software is equipped to assemble said split data received over at least one TCP/IP connection using said Stream Identifier and Block ID in a manner to be readily displayed on the each computer.

12. The method for performing one of a data stream over multiple TCP/IP connections and concurrent interleaves of multiple data streams over multiple TCP/IP connections between at least two computers of claim 7, wherein said data stream optimizing software establishes at least one TCP/IP connection.

* * * * *